UNITED STATES PATENT OFFICE.

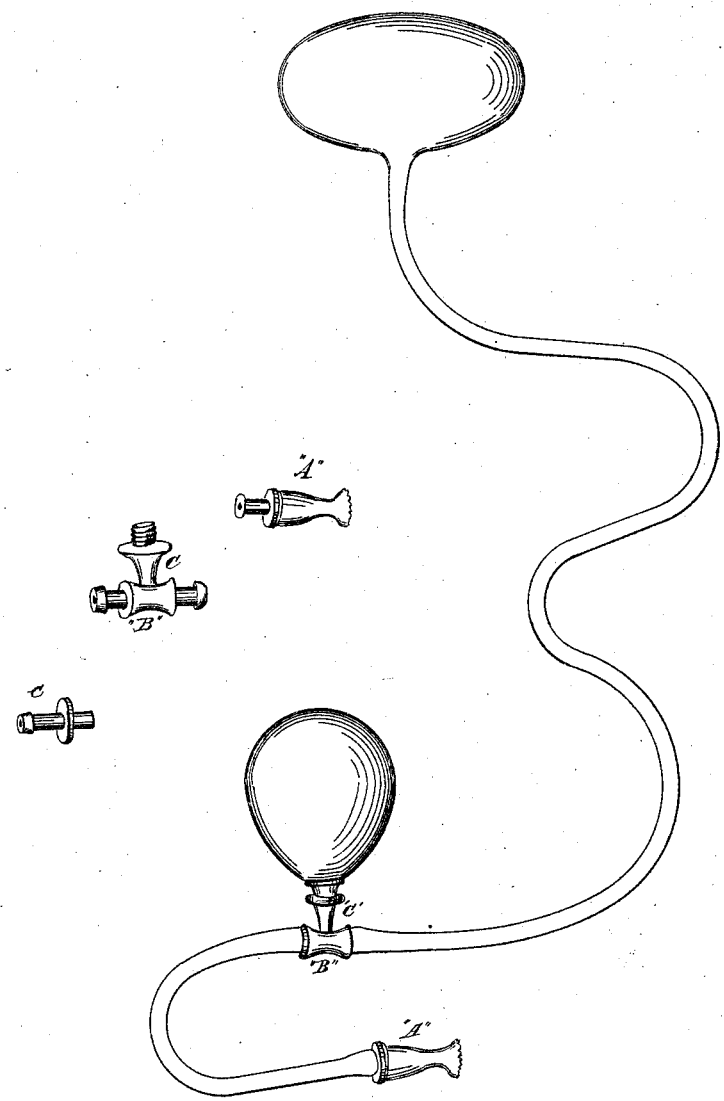

ISRAEL STEALY, OF CRESTLINE, OHIO.

IMPROVEMENT IN PESSARIES.

Specification forming part of Letters Patent No. 55,733, dated June 19, 1866.

*To all whom it may concern:*

Be it known that I, ISRAEL STEALY, of Crestline, in the county of Crawford, in the State of Ohio, have invented a new and Improved Pessary as a mode of preventing female weakness in the womb; and I do hereby declare that the following is a full and exact description thereof, reference being had to the accompanying drawings, and to the letters of reference marked thereon.

The nature of my invention consists in providing and constructing a rubber globe (hollow) of from two to six inches in diameter when filled with air, with a pipe of the same material extending from said globe from twelve to twenty inches, as the case may require, and from one-fourth to one-half inch in diameter when filled with air. On the end of said pipe is a zinc tube, A, one and one-half inch long, with a valve in the end, for the purpose of filling said globe with air and holding the same when filled. About three inches from said tube A is another tube, B C, constructed of the same material, with a rubber bellows two inches in diameter when filled with air, attached to said tube B C by a screw, for the purpose of filling said globe with air. Said globe on the end of said pipe is to be inserted under the womb when empty, then filled with air by said bellows, in order to press upward against the womb to support it and to prevent weakness and pain therefrom, and to secure ease and comfort to the suffering patient, and when it is desired to let off the air the said bellows may be unscrewed from the tube B C, and that will let the air pass out through the opening.

What I claim as my invention, and desire to secure by Letters Patent, is—

The application of a rubber globe under the womb, to be filled with air after inserting the same, in order that it may press upward against the womb to prevent falling, weakness, and pain, and thereby give ease, comfort, and strength to the suffering patient.

ISRAEL STEALY.

Witnesses:
HENRY MADDOX,
HIRAM SLACK.